Oct. 22, 1946.     R. G. JANES     2,409,762
CONTROLLER MECHANISM
Filed Nov. 20, 1942     5 Sheets-Sheet 4

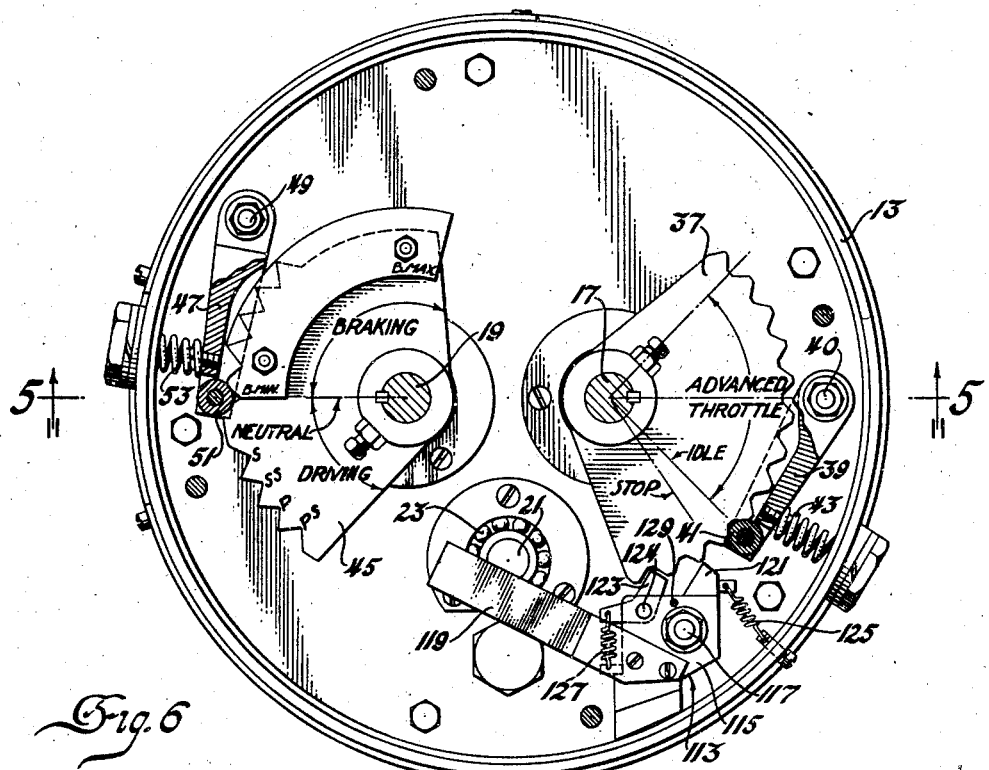

Inventor
Russel G. Janes

Oct. 22, 1946.                R. G. JANES                2,409,762
                         CONTROLLER MECHANISM
                    Filed Nov. 20, 1942            5 Sheets-Sheet 5

Inventor
Russel G. Janes
By Blackmore, Spencer & Flint
Attorney

Patented Oct. 22, 1946

2,409,762

UNITED STATES PATENT OFFICE 2,409,762

CONTROLLER MECHANISM

Russel G. Janes, La Grange, Ill., assignor to General Motors Corporation, Detroit, Mich., a corporation of Delaware Application November 20, 1942, Serial No. 466,387

5 Claims. (Cl. 74—483)

1

The present invention relates to a manually operable controller and more particularly to a controller mechanism for a Diesel electric locomotive.

The principal object of the present invention is to provide a compact controller mechanism for controlling a generating electric traction and braking system, of the type used on locomotives, in which a plurality of manually operable control means are interlocked together to prevent unauthorized operation thereof and to provide proper cooperation therebetween, certain of said control means being also provided with motion regulating means to insure proper rate of manual movement thereof in order to obtain efficient operation of the locomotive and to provide maximum protection for both the controller and the combined locomotive driving and braking means controlled thereby.

The combined controller mechanism by which the above and other objects are obtained will be better understood by reference to the following detailed description of the combination of means included in the controller, which is illustrated in the accompanying drawings.

Figure 1 is a vertical elevation of the controller.

Figures 2 and 3 are enlarged views of the upper portion of the controller shown in Figure 1, Figure 2 being a vertical sectional view taken on line 2—2 of Figure 4 with certain parts broken away and Figure 3 being an elevation view taken on lines 3—3 of Figure 2.

Figures 4, 6, 7, 9, and 11 are section views taken respectively on lines 4—4, 6—6, 7—7, 9—9 and 11—11 of Figure 1 with parts removed or broken away in certain of these figures.

Figures 1, 2, 3:
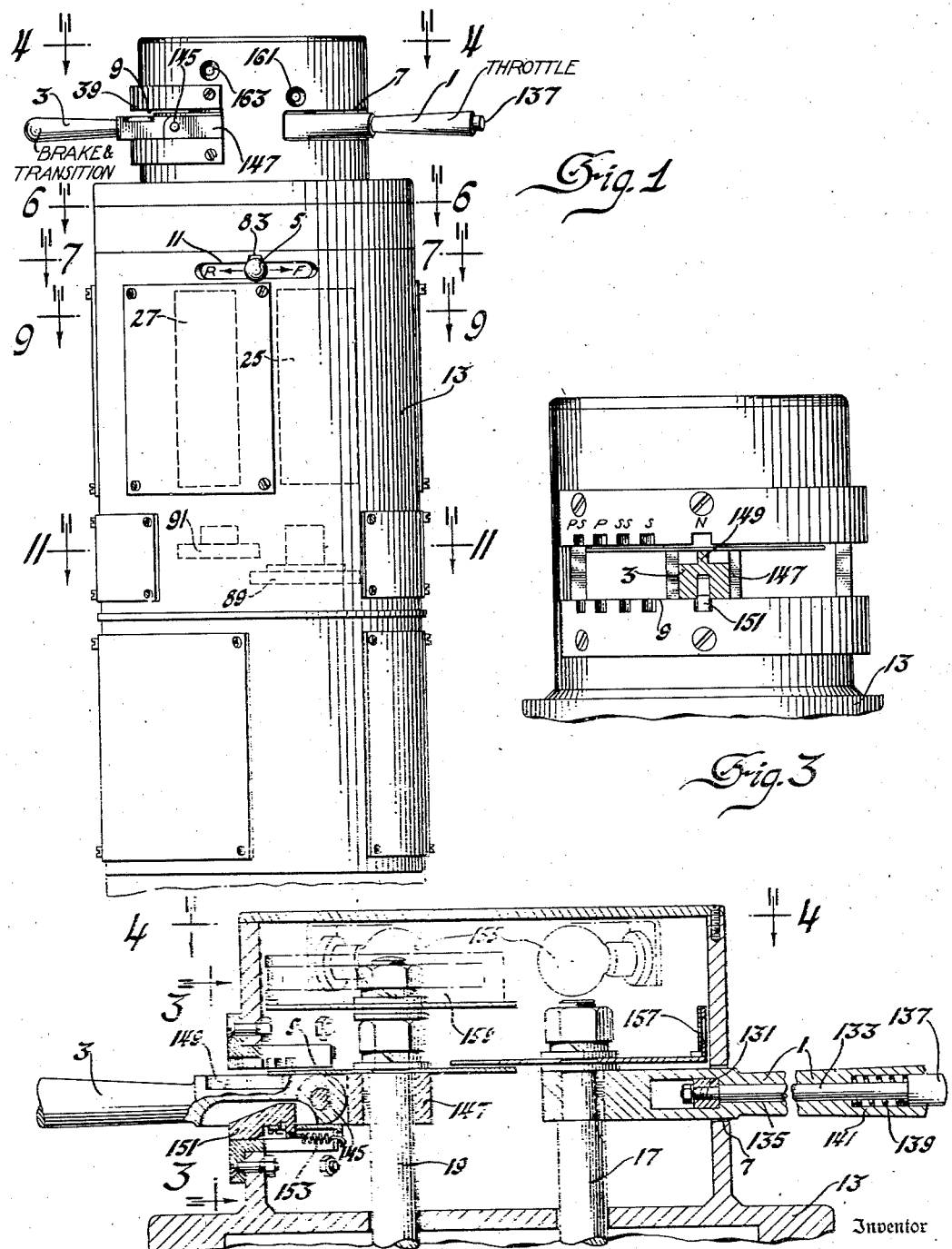
Figure 4:
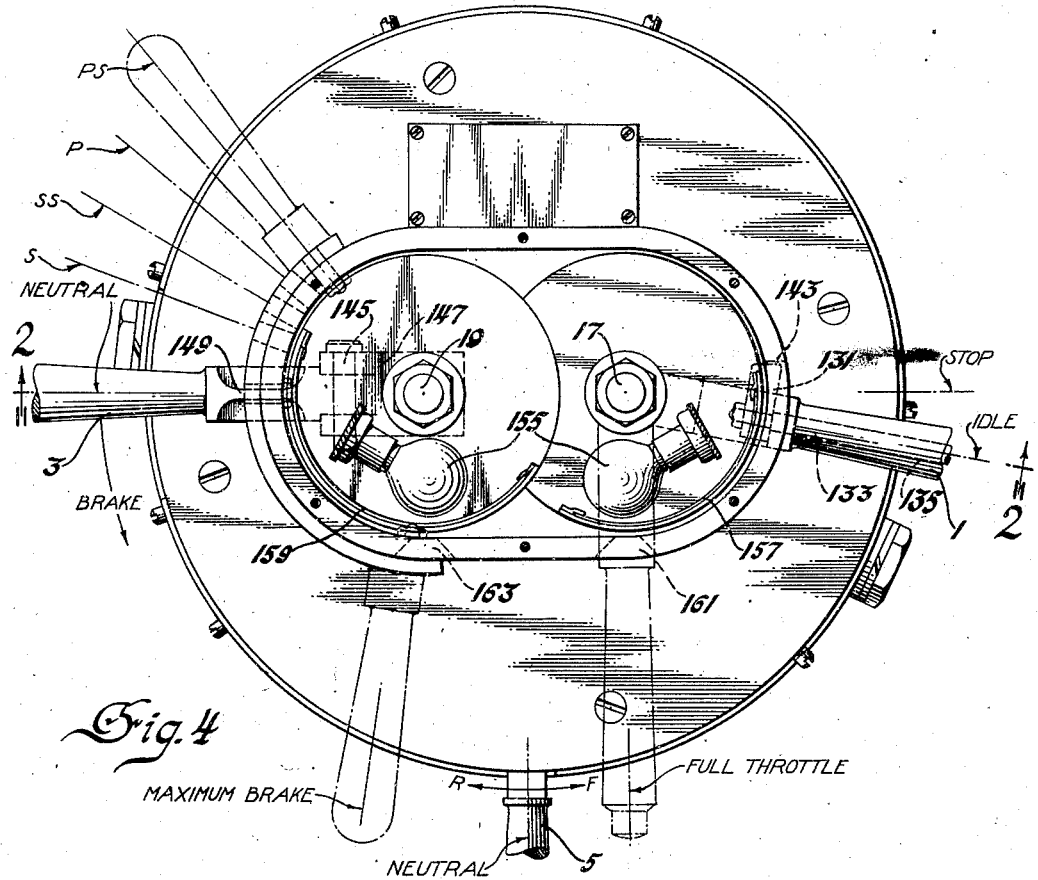

Referring to Figure 1 it will be observed that the controller is generally cylindrical in form provided with three control lever handles 1, 3 and 5 shown projecting horizontally outward through horizontal slots 7, 9 and 11 in the vertical side wall of the cylindrical controller housing 13 serving as control lever quadrants, and the housing base is adapted to be supported on the deck of the locomotive. The lever 1 is a throttle control lever which is movable clockwise, as best shown in Figure 4, from the idle position in which it is shown, toward the full throttle position to increase the engine speed and also movable in the opposite direction from the idle position to an engine stop position. The lever 3 serves as a combined transition and braking control lever which when moved clockwise from the neutral or off position, in which it is shown in Figure 4, to driving positions S, SS, P and PS causes the traction motors to be connected to the generator in series parallel, series parallel shunt, parallel and parallel shunt respectively. The shunt positions SS and PS controlling the shunting of the traction motor field windings with the motors respectively connected in series-parallel or parallel with the generator. Movement of the lever 3 in the opposite direction or counterclockwise from the neutral position causes the motors to be connected in a dynamic braking circuit relation and also operates a rheostat, shown generally at 15 in Figure 10, to vary the motor excitation in steps to vary the braking action from zero to maximum as indicated in Figure 4. The lever 5 is a reverse control lever movable in either direction from the neutral or off position, as shown in Figure 4, to either a forward position F or a reverse position R to reverse the traction motors.

Figure 5:
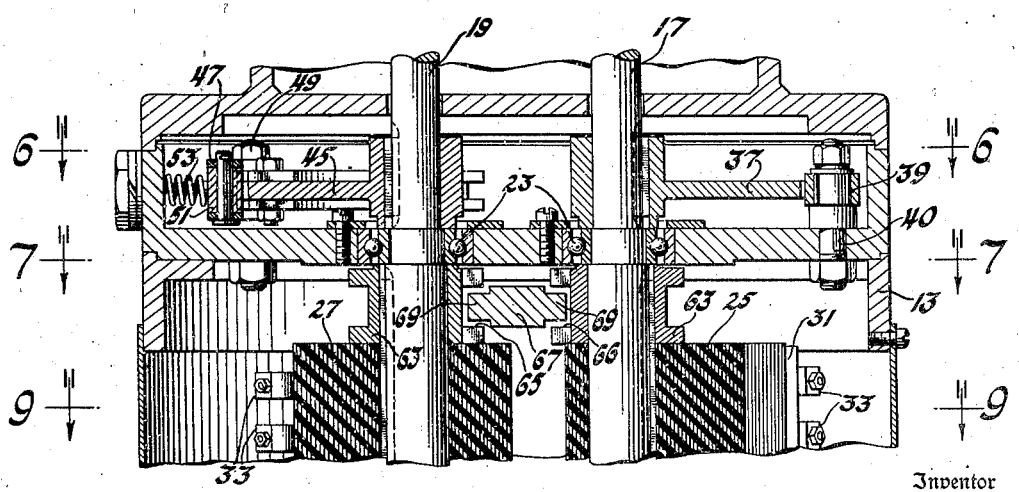
Figure 5 is a sectional view taken on line 5—5 of Figure 6 having certain of the parts broken away.
Figures 8, 9, 9A:
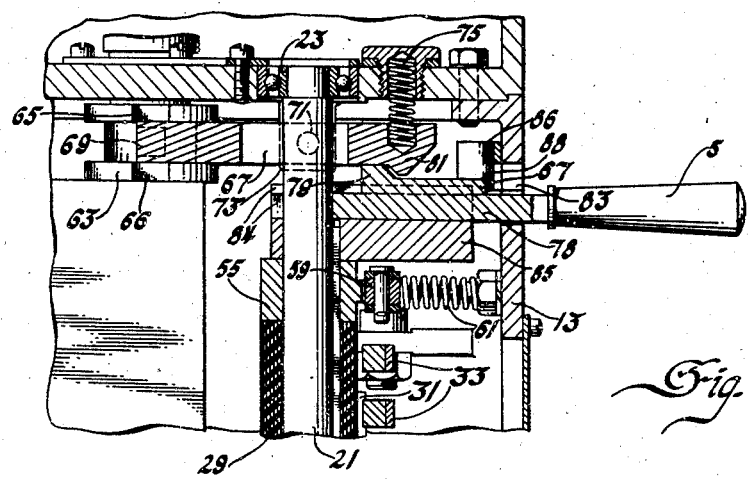
Figure 8 is a sectional view taken on line 8—8 of Figure 7 with certain parts broken away.
Figure 9a is an enlarged view taken on line 9a—9a of Figure 9 with parts broken away to clearly show the construction of one of the controller contact fingers and Figure 10 is a sectional view taken on line 10—10 of Figure 11 with certain of the parts broken away.
Figure 10:
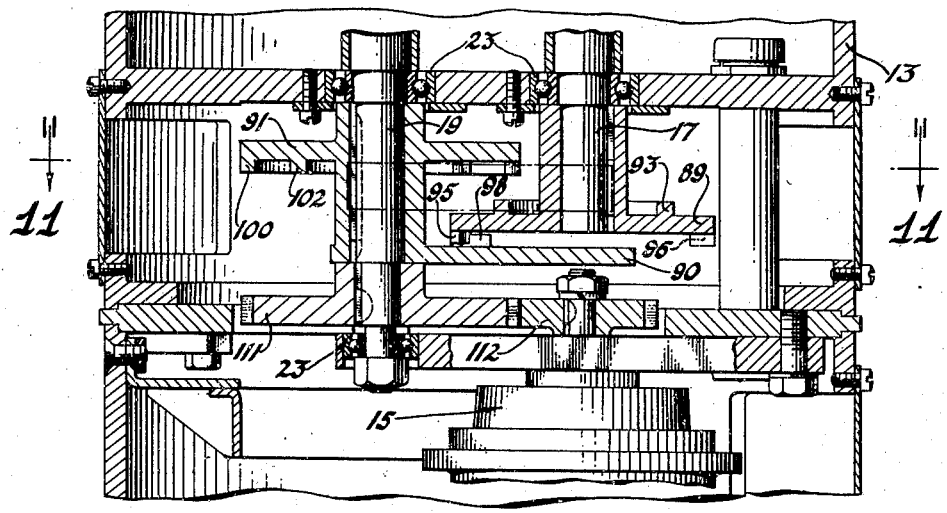

Each of the above levers 1, 3 and 5 as best shown in Figures 2, 4, 5, and 8 to 11 are operatively connected, by means to be described, to individual control shafts, 17, 19 and 21 rotatably supported in vertical parallel relation in the housing 13 by anti-friction bearings 23 shown in Figures 5 and 10 located in transverse portions of the controller housing 13. To each of the shafts 17, 19 and 21 an insulated control drum is fixed; these drums being shown at 25, 27 and 29, in Figures 5, 8, and 9. A plurality of electric contacts 31 are carried on each of these movable drums which are movable into and out of contact with electrical contact fingers shown generally at 33. The electrical contact fingers for each drum are supported on separate insulating blocks 35 fixed adjacent to each drum on the controller housing 13 as best shown in Figures 5, 8 and 9. All of the contact fingers 33 are identical, and as best shown in Figures 9 and 9a each finger comprises a pair of contact plates 36 and 38 having bent end portions 36a and 38a connected by a hinge pin 42. An adjustable stop screw 44 is shown extending through an opening in the end portion 36a and threaded to the end portion 38a and locked thereto by a nut 44a. A compression spring 46 is carried on the screw 44 between the end portions 36a and 38a and a flexible conductor 50 is provided to electrically interconnect the contact plates 36 and 38. The contact plate 38 is provided with a removable contact tip 48 fixed thereon by a screw 48a. The contact plates 36 are fixed to the insulating blocks 35 and the springs 46 of each finger urge the respective contact tips 48 of each contact plate 38 into contact with the controller drum contacts 31. The amount of inward movement of the contact plates 38 and contacts 48 may be adjusted by the stop screws 44. It will be evident that any well known type of electromagnetic or electro-pneumatic actuating means may be individually connected to the contact fingers and contacts of each of the drums for energization and actuation thereof in any desired sequence, in order to operate the respective engine and motor control means previously described upon movement of any one of the levers 1, 3, and 5.

Each of the shafts 17, 19 and 21 are also provided with similar detent means for allowing manual movement thereof to any one of a plurality of angular positions and for holding each of these shafts in any one of these positions. Each of these detent mechanisms include a star wheel fixed to each shaft having a plurality of notches in the periphery thereof and a spring biased detent lever having a detent engageable with the peripheral portion of the respective star wheels and individual peripheral notches provided therein. The peripheral portions of the star wheels are labeled in Figures 6 and 9 to indicate these control positions and the direction of movement of the star wheels to these positions. As best shown in Figure 6 the detent mechanism for the throttle control shaft 17 comprises a star wheel 37 fixed thereto and a detent lever 39 pivoted at 40 on the housing 13 and having a detent roller 41 carried thereby which is biased into engagement with any one of the peripheral notches of the star wheel 37 by a spring 43 placed between the lever 39 and the wall of the housing 13. The detent mechanism for the combined transition and braking control shaft 19 comprises a star wheel 45 fixed thereto, having a plurality of notches in one extremity of its periphery and a smooth portion adjacent thereto and a detent lever 47 pivoted at 49 on the housing 13 having a detent roller 51 carried thereby which is biased into engagement with the periphery of the star wheel 45 by a spring 53 placed between the lever 47 and the wall of the housing 13. The detent mechanism for the reverse control shaft 21 is best shown in Figure 9 and includes a star wheel 55 fixed to the shaft 21 and a detent lever 57 pivoted at 58 on the housing 13 and having a roller 59 carried thereby which is biased into engagement with any one of the three notches in the periphery of the star wheel 55 by a spring 61 placed between the lever 57 and the wall of the housing 13.

To prevent unauthorized movement of the controller shafts 17, 19 and 21 the reverse lever 5 also serves as a removable key to permit movement of these shafts only when it is inserted in the controller and to lock these shafts when it is removed from the controller. The shaft locking mechanism operated by the reverse lever is best shown in Figures 7 and 8 and includes two collars 63, one fixed to the shaft 17 and the other fixed to the shaft 19 adjacent the other collar. These collars are provided with axially aligned slots 65 and 66. A locking lever 67 having a dog portion 69 on its inner end is adapted to enter the slots 65 and 66 in the collars to prevent angular movement thereof. The locking lever 67 is pivoted at 71 to housing bosses 73 and is biased by a spring 75 so that the locking lever dog 69 normally tends to enter the upper slots 65 in the collars 63. The spring 75 is shown placed between the lever 67 and a transverse housing portion.

The reverse lever 5 cannot be inserted or removed from the housing 13 respectively to unlock or lock the shafts 17 and 19, and consequently the throttle lever 1 and transition and braking lever 3, until the throttle lever shaft 17 is in the idle position and the transition and braking lever and also the reversing shaft 21 are in the neutral position.

The structure for accomplishing this protective feature includes a cam 79 formed on the inner end of the reverse lever 5 and a cam 81 formed on the outer end of the locking lever 67. The reverse lever 5 can only be inserted or removed through an enlargement 83 in the central portion of the slot 11 in the controller housing adjacent the neutral position of the reverse lever 5. This enlargement 83 is of such dimensions to allow the reverse lever cam 79 to pass therethrough and permit the inner end of the lever 5 to enter a key slot 84 in a lever 85 shown fixed to the upper end of the reverse control shaft 21. Further inward movement of the cam 79 initially causes it to contact the cam 81 on the locking lever 67 and move it upwardly against the action of the spring 75 to cause the dog 69 on the other end to move downwardly out of the upper slots 65 in the collars 63 and enter the lower slots 66 in the collars when the cams are vertically aligned and to finally be moved upward by the spring 75 out of the lower slots 66 when the cam 79 is moved past the cam 81 and reaches the position between the lower and upper slots as best shown in Figure 8. When the reverse lever is fully inserted into the controller and is in the neutral position, as shown, it is retained in this position in the housing 13 by the spring 75 and the cams 81 and 79 formed respectively on locking lever 67 and reverse lever 5 as best illustrated in Figure 8. The reverse lever 5 is also retained in this same relative position on the lever 85 fixed to the shaft 21 when these levers and the shaft are moved angularly with respect to the locking lever 67, from the neutral position to the forward or reverse positions F or R, by an arcuate retainer 86 which extends angularly on both sides of the central enlargement 83 of the slot 11 and is fixed to the inner wall of the housing 13, as best shown in Figures 7 and 8. It will be apparent that the retainer 86 prevents radial outward movement of the reverse lever 5 with respect to the lever 85 and housing 13 when it is moved angularly away from the neutral position as an outer vertical edge 87 provided on an upstanding portion 88 of the reverse lever 5 which will then contact the inner vertical surface retainer 86.

Figure 11:
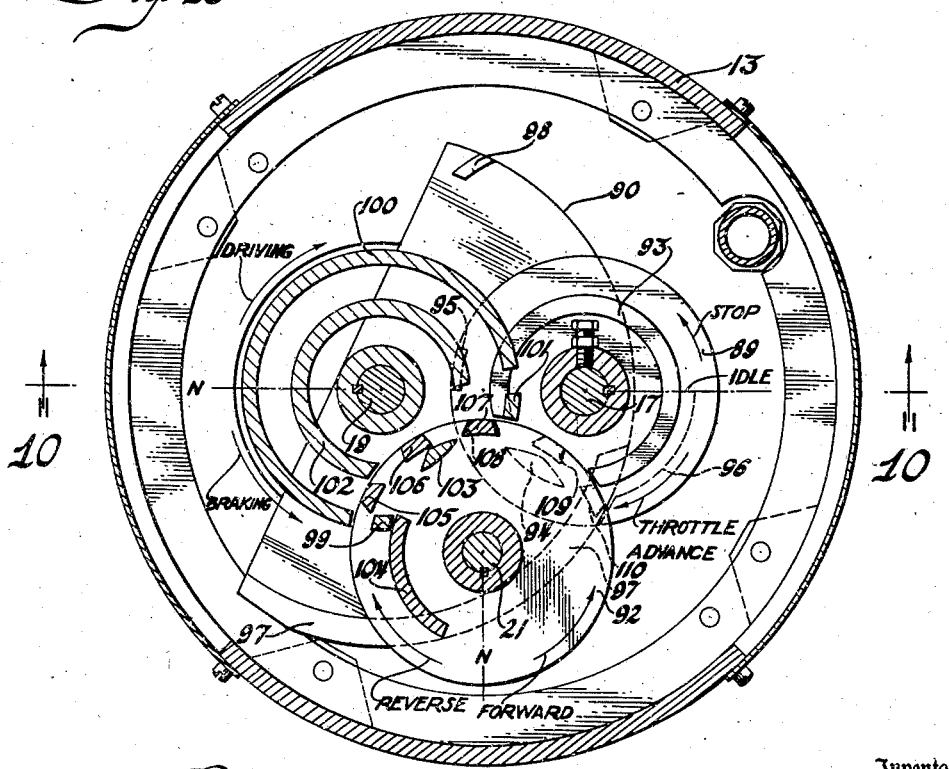

In addition to the above described locking means described between the three shafts 17, 19 and 21, interlocking means as best shown in Figures 10 and 11 are also provided between these three shafts to allow only proper relative angular movement therebetween for certain relative angular positions of the respective control shafts. This interlocking means comprises flanges 89, 90, 91 and 92 fixed on the control shafts 17, 19 and 21 in the positions as shown best in Figures 10 and 11. Each of the flanges have integral axially extending projections of suitable dimensions and are positioned on the control shafts so that for certain relative angular positions of the control shafts the axial flange projections either permit or block relative movement of these shafts. The flange 89 is fixed to the throttle control shaft 17 and is provided with projections 93 and 94 extending axially upward and projections 95 and 96 extending axially downward. The flange 90 is fixed on the control shaft 19 and is provided with projections 97 and 98 extending axially upward. The flange 91 is integral with the flange 90 and axially displaced upwardly therefrom and is provided with projections 99, 100, 101, 102 and 103 extending axially downward. The flange 92 is fixed on the reverse control shaft 21 and extends horizontally between the flanges 89 and 91 and is provided with projections 104, 105, 106 and 107 extending axially upwardly and projections 108, 109 and 110 extending axially downward. The upwardly extending projection 107 is directly above the downwardly extending projection 108, as shown in Figure 11. The flanges 89, 90, 91 and 92 and the axially extending projections thereon are arranged on the shafts 17, 19, and 21 so that the downwardly extending projections 95 and 96 move in the same plane as the upwardly extending projections 97 and 98 of the flange 90 and the upwardly extending projections 93 and 94 the flange 89 move in the same plane as the downwardly extending projections 108, 109 and 110 of the flange 92 and the upwardly extending projections 104, 105 106 and 107 of the flange 92 move in a plane with the downwardly extending projections 99, 100, 101, 102, and 103 of the flange 91. With the control shafts 17, 19 and 21 and the flanges 89, 90, 91 and 92 in the positions shown in Figure 11 corresponding to the idle position of the throttle lever 1 and the neutral position of both the combined transition and braking lever 3 and reverse lever 5 the following movements of the control shafts by the control levers are permitted:

The transition and braking control shaft 19 may be moved clockwise by the control lever 3 to any of the motor driving control positions S, SS, P and PS but it cannot be moved counterclockwise beyond the neutral position to the braking positions as the downwardly extending projection 99 on the flange 91 fixed to the transition and braking control shaft 19 engages the upwardly extending projection 104 on the flange 92 fixed to the reverse control shaft 21.

The throttle control shaft 17 may be moved counterclockwise to the engine stop position by the throttle control lever 1 but it cannot be advanced clockwise toward full throttle position to increase the engine speed as the projection 96 on the flange 89 on the throttle control shaft 17 is then blocked by the projection 97 on the flange 90 on the transition control shaft 19 when it is in the neutral position. Upon movement of the transition and brake lever 3 to any of the motor driving positions S, SS, P or PS the projection 97 on the flange 90 is moved out of blocking relation with the projection 96 on the flange 89 on the throttle control shaft 17 so that it may then be moved by the throttle control lever 1 toward the full throttle position. If the reverse lever 5 is retained in the neutral position when the transition and braking control lever 3 is in any of the positions S, SS, P or PS the throttle may be moved from the idle position to the full throttle position to increase the engine speed without causing movement of the locomotive by the traction motors. This allows the engine to drive auxiliaries such as air compressors to quickly charge the air reservoirs, not shown.

With the flanges 89, 90, 91 and 92 in the position shown in order to cause the traction motors to drive the locomotive in forward direction the reverse lever 5 is moved to the forward position, the transition lever 3 is moved to the series parallel position S and the throttle lever 1 is moved toward the full throttle position. The projections 100, 101, 102 and 103 of the flange 91 on the shaft 19 then being between the projections 105, 106 and 107 of the flange 92 on the reverse control shaft 21 when it is in the forward position makes it necessary that the transition and braking control shaft must be moved back to the series-parallel or neutral position before the reverse control shaft 21 can be moved back to the neutral position. Also with reverse control shaft 21 in the forward position the throttle control shaft 17 may be moved from the idle position to the full throttle position so that the projections 93 and 94 of the flange 89 on the throttle control shaft 17 are then moved between the projections 109 and 110 of the flange 92 on the reverse control shaft 17 which also makes it necessary for the throttle control shaft 17 to be moved back to the idle position before the reverse control shaft 21 can be moved back to the neutral position.

Movement of the throttle control shaft 17 to the full throttle position causes the projection 95 of the flange 89 on the throttle control shaft 17 to be moved into blocking relation with the projection 98 of the flange 90 on the transition and braking control shaft 19 making it necessary that the throttle control shaft be moved backward toward the idle position an amount necessary to reduce the engine speed to a lower value before the transition control shaft 19 can be moved between the series-parallel-shunt and parallel positions SS and P respectively. This insures a smooth transition of the motor connection between the series-parallel and parallel circuit relations.

As previously described the transition and braking control shaft 19 cannot be moved counterclockwise from the neutral position to the braking positions when the reverse control shaft is in the neutral position as the projection 104 is in blocking relation with the projection 99 of the flange 91 on the transition and braking control shaft. This blocking relation also takes place when the reverse control shaft is in the reverse position. In order to move the shaft 19 to the braking positions the reverse control shaft 21 must be in the forward position and the throttle control shaft 17 must be in the idle position so that the projections 99, 100, 102 and 103 on the flange 91 and the projection 97 on the flange 90 may move past the projections 104, 105, 106 and 107 of the flange 92 on the reverse control shaft and past the projection 96 of the flange 89 on the throttle control shaft.

With the reverse control shaft 21 in the forward position the projections 100, 101, 102 and 103 of the flange 91 fixed thereon may be moved between the projections 105, 106 and 107 of the flange 92 on the reverse control shaft 21 and with the throttle control shaft 17 in the idle position the projection 97 of the flange 90 on the shaft 19 may be moved past the projection 96 of the flange 89 on the throttle control shaft 17 to allow the shaft 19 to be moved to any of the motor braking positions. The motor braking connections therefore can only be established when the reverse lever 5 is in the forward position and when the throttle lever in the idle position.

With the reverse control shaft 21 in the reverse position the projections 100, 101, 102 and 103 of the flange 91 on the transition and braking control shaft 19 and also the projections 93 and 94 of the throttle control shaft 17 may be moved past the projections 105, 107, 108, 109 and 110 to establish the reverse driving connection of the motors to cause reverse movement of the locomotive which makes it necessary to return the transition and braking control shaft 19 to the neutral position and to return the throttle control shaft 17 to the idle position before the reverse control shaft 21 may be returned to the neutral position. The motor braking connections cannot be established when the reverse control shaft is in the reverse position for the reasons given above. The above described interlocking means provides protection for both the controller and also the engine generator and traction motors controlled thereby by insuring proper relative angular movements of the control shafts.

Any movement of the transition and braking control shaft 19 is transmitted to the driving gear 111 fixed thereon which rotates a gear 112 meshing therewith fixed to the shaft of the rheostat shown generally at 15. This rheostat as previously mentioned controls the excitation of the motors when connected in the braking circuits. The farther the transition and braking lever 3 is moved from the neutral position toward the maximum braking positions the greater the motor excitation and hence the greater the dynamic braking force exerted by the motors on the locomotive traction wheels.

In addition to the above described locking and interlocking mechanisms included in the controller, motion regulating means is provided for the throttle control shaft 17 and the transition and braking control shaft 19 to insure step by step movement thereof in controlling the locomotive in a manner whereby maximum acceleration rates may be obtained without overloading and damage to the combined locomotive driving means controlled thereby.

The motion regulating means provided to regulate step by step manual advance of the throttle lever 1 in order to increase the engine speed at a controlled rate is best shown in Figure 6. This means comprises a pawl mechanism shown generally at 113 which includes a pawl block 115 mounted on a vertical pivot pin 117 fixed on a transverse portion of the housing 13. An inertia arm 119 and a pawl 121 are fixed to the pawl block 115 and a second pawl 123 is pivotally mounted at 124 on the block 115. A spring 125 is connected between the pawl 121 and the housing 13 to normally hold the block 115 in the position shown in Figure 6, with the pawls 121 and 123 immediately adjacent the star wheel 37 which is fixed to the throttle control shaft 17. The pivoted pawl 123 is normally held in the position shown with reference to the block 115 so that one end thereof is normally positioned between the sides of any notch in the star wheel 37 by means of a spring 127 connected between pawl 123 and block 115. The pawls 121 and 123 are spaced on the block 115 and are of such form that upon clockwise or advance movement of the throttle control shaft 17 and star wheel 37 fixed thereto the pawl 123 will be contacted by one side of any notch of the star wheel 37 to cause the pawl block to be rotated counterclockwise about the pivot pin 117 and cause the pawl 121 to enter an adjacent notch of the star wheel to stop movement thereof after it has moved one notch only. When the pawl 121 has been fully entered into a notch the pawl 123 will have been rotated clockwise about the pivot 124 on the pawl block 115 until it contacts a stop in 129 fixed on the pawl block and the end of the pawl 123 will then be in a position to enter a notch of the star wheel adjacent that of the notch it initially occupied. The only way of advancing the throttle lever 1 another notch is to momentarily release the manual pressure on the throttle lever 1 tending to advance the throttle shaft which allows the spring 125 to return the complete pawl mechanism 113 back to its original position as shown in Figure 6, in which it is positioned for similar action to allow another notch of advance movement only of the throttle control shaft. The inertia arm 119 is provided to prevent undamped oscillating movement of the pawl block 115 about the pivot 117 which would allow other than notch by notch advance movement of the throttle control shaft 17. The above described pawl mechanism 113 allows unrestrained backward movement of the throttle control shaft 17 upon movement of the throttle lever 1 back to the idle position, as the pivoted pawl 123 will then be moved clockwise about the pivot 124 which prevents any blocking action of the star wheel 37 by the pawl 121. The throttle lever 1 is prevented from being moved beyond the idle position to the stop position by the following means. The lever 1, as best shown in Figures 2 and 4 is provided with a pawl 131 fixed to a rod 133 movable in a central bore 135 in the lever 1 and having a thumb button 137 fixed on the end of the rod and extending outwardly beyond the outer end of this lever. The pawl, rod and thumb button are held in this position by a spring 139 placed in a counterbore 141 in the lever 1 and bearing on the thumb button. When the throttle lever is therefore suddenly moved toward the idle position the pawl 131 will be biased by the spring 139 to engage a stop 143 formed in the housing, as best shown in Figure 4, making it necessary to press the thumb button 137 in order to move the pawl 131 away from the stop 143 to permit the throttle lever to then be moved to the stop position from the idle position.

The transition and braking control lever 3 and shaft 19 are likewise confined to step by step movement in either direction between the neutral position N and the driving control positions S, SS, P and PS to control change and transition of the traction motor driving connections by the following means. The horizontal slot 9 through which the transition and braking control lever 3 extends, is provided with five vertically aligned pawl slots in its horizontal upper and lower edges adjacent the control positions N, S, SS, P and PS as best shown in Figures 2, 3 and 4. The lever 3 is mounted on a horizontal pivot pin 145 carried on a lever 147 fixed to the shaft 19 as best shown in Figure 2. An upwardly projecting pawl portion 149 is provided on the lever 3 which is adapted to enter the upper pawl slots when the lever 3 is moved upwardly about the pivot point 145 from the position it normally occupies as best shown in Figure 2 when it is adjacent each of the control positions N, S, SS, P and PS. The lever 3 is held normally in a horizontal position, as shown. A pawl 151 is pivoted on the lever 3 and biased downwardly in vertical alignment with respect to the pawl portion 149 by action of a spring 153 fixed between pawl 151 and the lever 3 which also biases the pawl 151 so that it is caused to enter the lower pawl slots, as shown in Figure 2, when the lever is adjacent to the control positions N, S, SS, P and PS. With the pawl 151 fully entered into any one of the lower slots, the upper pawl portion 149 of the lever 3 is entirely removed from the upper pawl slot in vertical alignment with said lower pawl slot. The upper pawl portion 149 of the lever 3 is made narrower than that of the pawl slot, measured in a direction transverse to the axis of the lever 3, so that the following vertical and horizontal movements of the lever 3 are necessary to move it in either direction from any control position to another immediately adjacent thereto. Vertical movement of the lever 3 about the pivot 145 removes the pawl 151 out of any of the lower pawl slots and causes the pawl portion 149 of the lever to then enter the upper pawl slot in vertical alignment with this lower slot. Horizontal movement of the lever with the lever held in this upward position then causes the pawl portion of the lever to contact one side of the upper slot which moves the pawl 151 to a position where it cannot again enter the lower slot it originally occupied, so that subsequent downward movement of the pawl portion out of the upper pawl slot and horizontal movement of the lever causes the pawl 151 to enter the next adjacent lower pawl slot by action of the spring 153 connected thereto to stop movement of the lever 3. The same sequence of vertical and horizontal movements of the lever 3 must be followed when it is desired to move the lever between any adjacent pawl slots for either horizontal direction of movement of the lever to cause a change between the neutral position and each of the control positions neutral S, SS, P and PS adjacent to the pawl slots. No pawl slots are provided in the slot 9 in the braking control range, and movement of the lever 3 to the braking positions is restricted only by the detent mechanism previously described to control the establishment of the motor dynamic braking connection and to control the motor excitation to vary the braking force exerted by the motors on the locomotive traction wheels.

In order to clearly indicate the positions in which both the throttle lever 1 and transition and braking lever are placed, incandescent lights 155 are mounted in the upper portion of the controller housing 13, as best shown in Figures 2 and 4, and translucent dials 157 and 159 are fixed respectively to the throttle control shaft 17 and transition and braking control shaft. The dials are marked to indicate the control positions and are illuminated by the lights so as to be clearly visible through the window 161 and 163 in the housing as best shown in Figure 1 in order that the positions to which each of the control shafts are moved may be easily observed by the locomotive engineer by day or night.

The above described combined controller mechanism has been found to satisfy the various service conditions and protection of both the controller and the locomotive driving and braking equipment controlled thereby and to insure proper manual movement of the control handles to obtain more efficient operating characteristics of the locomotive.

I claim:

1. A controller of the type described comprising a controller housing, a plurality of control shafts supported for movement in said housing, locking means moveably mounted on said housing and biased for locking engagement with certain of said control shafts, and a control lever adapted to be slideably mounted on one of said control shafts to engage and move said locking means to the unlocked position.

2. A controller of the type described comprising a housing having a control lever slot therein provided with an enlarged portion, a plurality of control shafts moveably supported in said housing, locking means moveable with respect to said housing and biased into locking relation with certain of said shafts, and a control lever adapted to be entered only through said slot enlargement for slideable engagement with one of said control shafts to engage and move said locking means to the unlocked position.

3. In a controller for a Diesel electric locomotive, a throttle shaft having a handle thereon for moving said shaft to stop, idle and full throttle positions, a motor control shaft having a handle thereon for moving said shaft to braking, neutral and driving positions, notches in said throttle and motor control shafts, a lock adapted to enter said shaft notches when said shafts are in the idle and neutral positions, resilient means for moving said lock into said shaft notches, a reverse control shaft movable between forward, neutral and reverse positions, a reverse lever adapted to be operatively engageable with said reverse control shaft and said lock in order to move said lock out of said shaft notches and to move said reverse control shaft to reverse, neutral and forward positions and interlocking means associated with each of said shafts and arranged to block movement of said motor control shaft to the braking positions unless said reverse and throttle control shafts are in the forward and idle positions, respectively, to block movement of said throttle shaft to full throttle position unless said motor control shaft is in the driving positions, to block movement of said motor control shaft to certain driving positions unless said throttle shaft is out of the full throttle position and to block movement of said reverse control shaft to the neutral position unless said throttle and motor control shafts are in the idle and neutral positions, respectively.

4. A controller for a Diesel electric locomotive comprising a housing having three slots, one of which is provided with an enlarged central portion, a throttle shaft having a lever thereon and projecting through one housing slot for moving said shaft to stop, idle and full throttle positions, a motor control shaft having a lever thereon and projecting out of another housing slot for moving said shaft to braking, neutral and driving positions, notches in each of said shafts, a lock pivoted on said housing and adapted to enter said shaft notches only when said shafts are in the idle and neutral positions, resilient means for moving said lock into said shaft notches, a reverse control shaft movable to a neutral position and forward and reverse positions either side of neutral, a reverse lever adapted to be inserted through said central enlargement of said other housing slot and into operative engagement with said reverse control shaft when in the neutral position and for also engaging and moving said lock out of said notches in said other control shafts and interlocking means associated with each of said shafts and arranged to block movement of said motor control shaft to the braking positions unless said reverse and throttle control shafts are in the forward and idle positions, respectively, to block movement of said throttle shaft to full throttle position unless said motor control shaft is in the driving positions, to block movement of said motor control shaft to certain driving positions unless said throttle shaft is out of the full throttle position and to block movement of said reverse control shaft to the neutral position unless said throttle and motor control shafts are in the idle and neutral positions, respectively.

5. A controller for a Diesel electric locomotive comprising a housing having three slots, one of which is provided with a central enlargement, a Diesel engine throttle control shaft having a handle thereon and projecting through one of said housing slots for moving said shaft to stop, idle and full throttle positions, a traction motor control shaft having a handle thereon and projecting out of another of said housing slots for moving said shaft to motor braking, driving and neutral positions, locking notches in said shafts, a lock pivoted on said housing movable into said locking notches only when said shafts are in the idle and neutral positions, respectively, spring means for urging said lock into said locking notches, a traction motor reversing control shaft having lever attaching means thereon for moving said shaft to a neutral position in alignment with said central enlargement in said other housing slot, a reverse lever insertable through said central housing slot enlargement and into said lever attaching means on said reverse control shaft and into contact with said lock to move said lock out of said locking notches to permit authorized movement of said shafts and interlocking means associated with each of said shafts arranged to block movement of said motor control shaft to the braking positions unless said reverse and throttle control shafts are in the forward and idle positions, respectively, to block movement of said throttle shaft to full throttle position unless said motor control shaft is in the driving positions, to block movement of said motor control shaft to certain driving positions unless said throttle shaft is out of the full throttle position and to block movement of said reverse control shaft to the neutral position unless said throttle and motor control shafts are in the idle and neutral positions, respectively.

RUSSEL G. JANES.